April 14, 1942.  A. M. STULTZ  2,280,013
ADJUSTABLE PIPE THREADER
Filed July 17, 1941  2 Sheets-Sheet 1
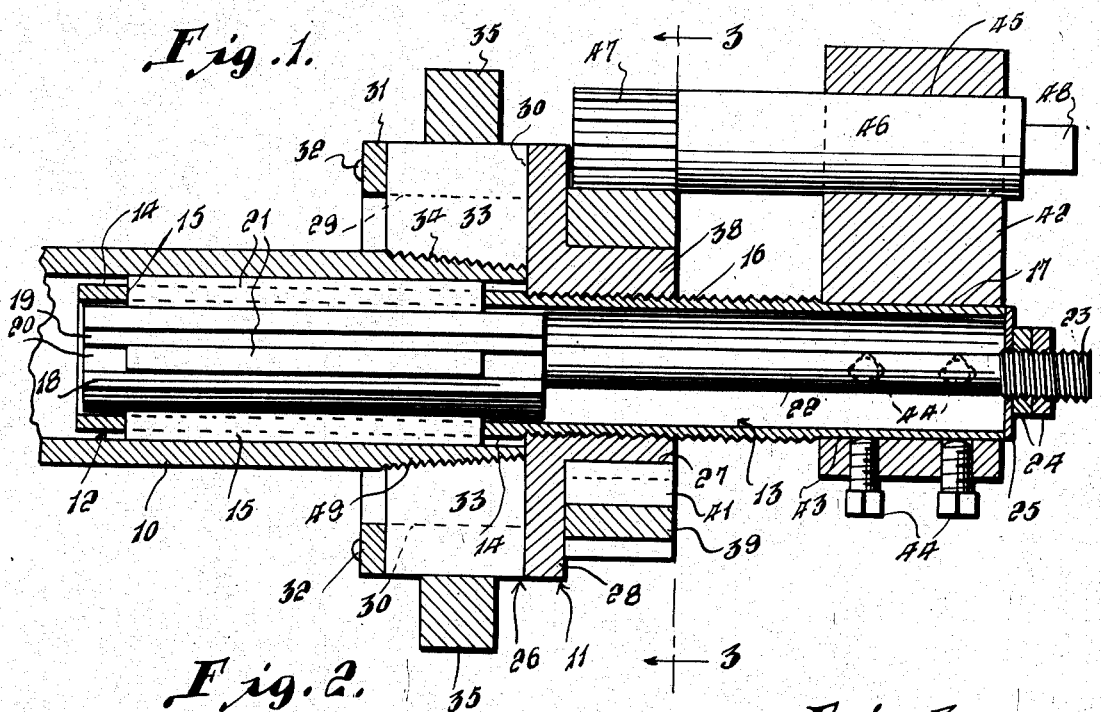
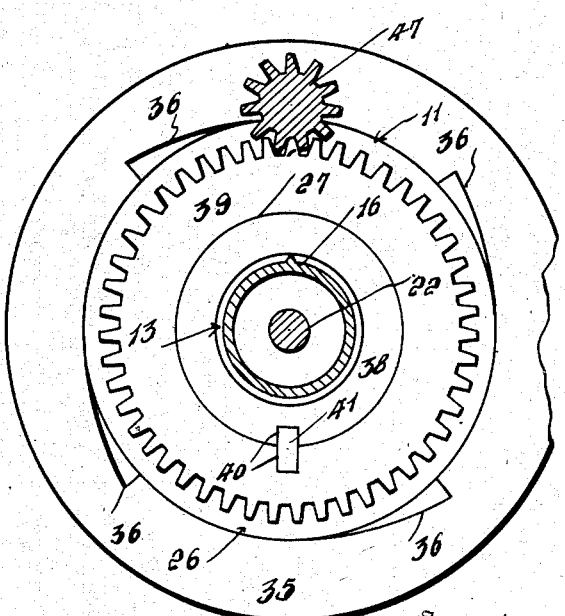
Inventor
Alfred M. Stultz
By L. F. Rudolph
Attorney April 14, 1942.　　　A. M. STULTZ　　　2,280,013
ADJUSTABLE PIPE THREADER
Filed July 17, 1941　　　2 Sheets-Sheet 2
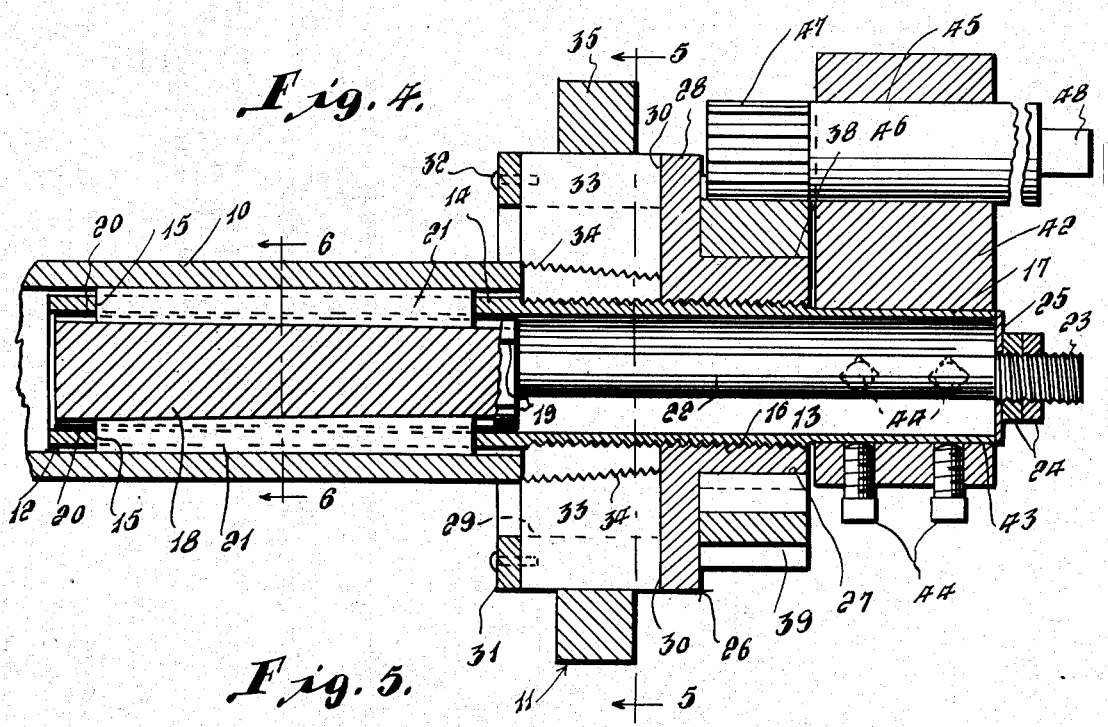
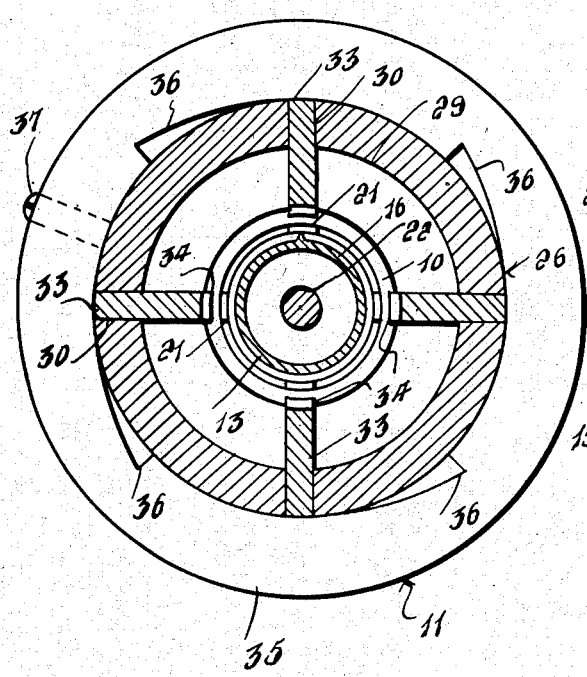
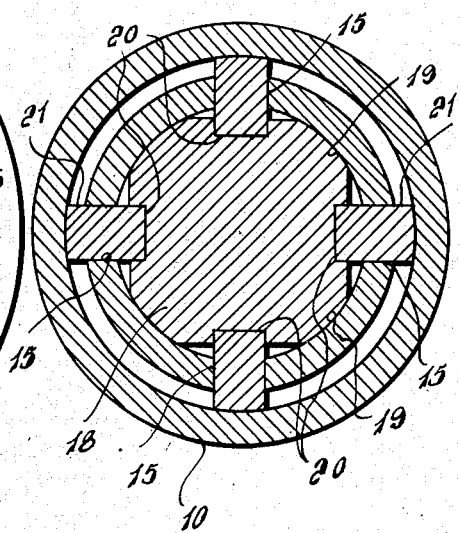
Inventor
Alfred M. Stultz
By L. F. Landreth
Attorney Patented Apr. 14, 1942

2,280,013

UNITED STATES PATENT OFFICE 2,280,013

ADJUSTABLE PIPE THREADER

Alfred M. Stultz, Arkansas City, Kans.

Application July 17, 1941, Serial No. 402,857

5 Claims. (Cl. 10—89)

This invention relates to an improved adjustable pipe threader of simple construction and which may be easily operated in a very restricted space for cutting a thread on the outer side of an end of a pipe.

More particularly, it is an aim of the invention to provide a pipe threader adaptable for use with pipes of different diameters and having walls of different thicknesses for cutting threads of various depths.

Still another aim of the invention is to provide a pipe threader having a chuck adapted to be detachably secured in the end of the pipe to be threaded and provided with wedge means for retaining the chuck in concentric relationship to the pipe so that the dies, carried by a die head mounted on the chuck, will be maintained in alinement with the pipe to thereby make it much easier to start the dies in alinement and to prevent them from starting out of line.

Still a further aim of the invention is to provide a pipe threader of simple construction containing three parts and which will require very little clearance around the pipe to be operated and which can thread an inch and a half on an end of a pipe having only two inches exposed.

Other objects and advantages of the invention will hereinafter become more fully apparent from the following description of the drawings, which illustrate a preferred embodiment thereof, and wherein:

Figure 1 is a longitudinal substantially central vertical sectional view, partly in elevation, of the pipe threader, Figure 2 is an end view in elevation looking toward the right hand end of Figure 1, Figure 3 is a cross sectional view taken substantially along the plane of the line 3—3 of Figure 1, Figure 4 is a view similar to Figure 1 showing the parts in the positions they will assume before the tool begins to cut the thread on the pipe, Figure 5 is a cross sectional view of the tool taken substantially along the plane of the line 5—5 of Figure 4, and Figure 6 is a similar view, on an enlarged scale, taken substantially along the plane of the line 6—6 of Figure 4.

Referring more particularly to the drawings, wherein like reference characters designate like or corresponding parts throughout the different views, 10 designates an end of a pipe to be threaded and 11 designates generally the adjustable pipe threader in its entirety and which includes a chuck, designated generally 12.

Chuck 12 includes a tubular member, designated generally 13 having an end 14 which is adapted to be disposed in the pipe 10 and which is provided with circumferentially spaced longitudinal slots 15 which extend to adjacent the ends of the tube portion 14, as best seen in Figures 1 and 4. The tubular member 13 is also provided with an externally threaded portion 16 which projects from the pipe 10 and a restricted opposite end 17. A rod 18 is disposed in the tubular end 14. Rod 18, as best seen in Figure 6, is substantially rectangular in cross section and is of a width somewhat less than the diameter of the interior of the end 14. The rod 18 is provided with circumferentially spaced longitudinally extending rounded portions 19 which engage the inner side of the tube portion 14 to prevent radial movement of the rod 18 relatively thereto but which do not engage sufficiently tight to prevent longitudinal movement of the rod 18. Rod 18 is provided with a longitudinal groove 20 in each of its sides, which grooves extend from end to end thereof and taper in depth toward the outer end of the rod 18. An elongated wedge element 21 is mounted in each of the slots 15 and extends substantially from end to end thereof. The inner, longitudinal edges of the wedge elements 21 are disposed in the grooves 20 and are tapered or beveled to correspond to the taper of said grooves. The wedge elements 21 are mounted to slide radially relatively to the slots 15 and are provided with rounded outer edges which engage the inner side of the pipe 10. A bolt or restricted shank 22 projects from the inner end of the rod 18 through and beyond the free end of the portion 17 and is provided with a threaded free end 23 to receive two nuts 24, forming an adjusting nut and a cap or lock nut, and a washer 25 which is held by the nuts 24 against the free end of the portion 17. It will be obvious that by tightening the nuts 24 the wedge rod 18 can be moved inwardly of the portion 14 to cause the grooves 20 to force the wedge elements 21 outwardly and into wedging engagement with the pipe 10. By loosening the nuts 24, the wedge rod 18 will be forced in the opposite direction for releasing the wedge elements 21 to permit removal of the chuck 12.

A die supporting head, designated generally 26, includes an internally threaded sleeve portion 27 which is adapted to engage the threads 16. An annular outwardly projecting flange 28 is formed integral with the inner end of the sleeve 27 and is provided with an annular forwardly extending flange 29, adjacent its periphery, and which extends toward the pipe 10. Flange 29 is provided with a plurality of equally spaced slots 30 which extend the width thereof and which open outwardly of its free edge. Said free edge is provided with a plurality of threaded recesses, and a ring 31 is disposed to engage against the free edge of the flange 29 and is provided with openings to aline with the recesses therein for receiving screws 32 for detachably connecting the ring 31 thereto and for closing the outer, open ends of the slots 30. The slots 30 are sized to slidably mount thread cutting dies 33, which are mounted to move radially therein and which are provided with inner toothed edges 34 which are inclined inwardly and toward the sleeve 27 and which are adapted to cut a thread on the free end of the pipe 10. The dies 33 are of sufficient width to frictionally engage the forward side of the flange 28 and the inner face of the ring 31 to prevent them from sliding freely in the slots 30 but to permit them to be forced inwardly or outwardly. The outer ends of the dies 33 project beyond the periphery of the flange 29. A ring 35 is turnably mounted on the flange 29 and has an inner face provided with corresponding circumferentially spaced eccentric portions 36 corresponding in number to the dies 33 and which are adapted to engage the outer ends of the dies for forcing them radially inward of the head 26 when the ring is turned in a counterclockwise direction, as seen in Figure 5, and for holding the dies 33 in corresponding positions relatively to the axis of the head 26. The ring 35 is provided with a set screw 37 which is adapted to be tightened to engage against the flange 29 for holding the ring 35 in any adjusted position.

As previously stated, the flange 28 projects outwardly from one end of the sleeve 27 and the remainder of said sleeve 27 forms an annular portion 38 on which is mounted a gear 39. As best seen in Figure 3, the portion 38 and gear 39 are provided with communicating grooves 40 which are disposed transversely of their circumferences for receiving a key 41 for detachably keying the gear 39 to the head 26. A block 42, as best seen in Figures 2 and 4, is provided with a transverse opening adjacent one end thereof, designated 43, for engaging the restricted portion 17. Block 42 is provided with a plurality of set screws which extend into the opening 43. Said set screws 44 are adapted to be tightened for adjustably clamping the block 42 to the portion 17. Block 42, adjacent its opposite end, is provided with an opening 45 for rotatably and slidably engaging a shaft 46 on one end of which is formed a pinion 47 which meshes with the gear 39. The shaft 46 is provided with an opposite, restricted end 48 which is polygonal shaped in cross section and which is adapted to be engaged by a turning tool, not shown, such as a ratchet wrench for turning the shaft 46.

Assuming the pipe threader 11 to be completely detached from pipe 10 in which a thread is adapted to be cut, the head 26 is screwed back on the portion 16 to the position, as seen in Figure 4, and the nuts 24 are loosened so that the rod 18 can be moved forwardly of the portion 14 to permit the wedge elements 21 to be moved inwardly of the portion 14. Portion 14 is inserted into the free end of the pipe 10 and the nuts 24 are then tightened to move the rod 18 inwardly of the tube portion 14 for forcing the wedge elements 21 outwardly and into clamping engagement with the pipe 10. Said wedge elements 21 are of sufficient length to hold the tubular member 13 concentric with the pipe 10 and the rod 18 is also held concentric therewith by engagement of its rounded portions 19 with the tube portion 14. Ring 35 is then adjusted to adjust the dies 33 to the outer diameter of the pipe 10 and also to adjust the dies for cutting a thread to any desired depth. The shaft 46 is then revolved to turn the gear 39 and the die supporting head 26 so that it will be moved toward the pipe 10, the threaded portion 16 functioning as a feed screw. Incidentally, the threads of the portion 16 correspond to the pitch of the threads 34 of the dies 33. As the die supporting head 26 moves forwardly the threads of the dies 33 will cut a thread in the outer side of the free end of the pipe 10 to form its tapered threaded end 49, as seen in Figure 1. The shaft 46 is slidably mounted in the bore 45 so that it can be moved forwardly with the head 26. The shaft 46 can then be turned in the opposite direction for retracting the head 26 and the nuts 24 can then be loosened for releasing the wedge elements 21, by forcing the rod 18 outwardly of the tube portion 14, to disconnect the thread cutter 11 from the pipe 10.

It will thus be seen that the thread cutter 11 may be used for cutting a thread in pipes of different diameters and of different thicknesses and may be employed where only a very small portion of an end of the pipe is exposed and where there is very little clearance around the pipe. As previously explained, the chuck 12 will be held concentric to the pipe 10 so that the head 26 will likewise be disposed in alinement therewith to make it easier for the dies to start cutting the thread and to prevent them from starting out of alinement with the pipe.

Various modifications and changes are contemplated and may obviously be resorted to as only a preferred embodiment of the invention has been disclosed.

I claim as my invention:

1. A pipe threader comprising a chuck, means for clamping one end of the chuck to an end of a pipe to be threaded, the opposite end of the chuck projecting from the pipe, and including a threaded portion, a thread cutting head having a threaded bore for engaging said threaded portion, said head being provided with a gear, a bearing detachably mounted on the last mentioned end of the chuck, a shaft turnably and slidably mounted in the bearing, a pinion on one end of the shaft for meshing with the gear, and the other end of the shaft being shaped to receive a turning tool for revolving the shaft and head.

2. A pipe threader as in claim 1, said clamping means being constructed and arranged for clamping the chuck to pipes of different sizes and for retaining the chuck concentric with the pipe, when clamped thereto.

3. A chuck for pipe threaders comprising a tubular member having an end adapted to be disposed in a pipe, wedge elements mounted for radial movement through said end of the tubular member and having inclined, inner longitudinal edges, a wedge member substantially square in cross section and having rounded longitudinal edges for slidably engaging the interior of the tubular member, the sides of the wedge member engaging the inner edges of the wedge elements for projecting said elements when the wedge member is advanced, the opposite end of the tubular member having a restricted opening, a threaded rod projecting from the inner end of the wedge member and through the opening, and a nut engaging the end of the rod and bearing against the outer side of the restricted end of the tubular member for advancing the wedge member, when the nut is turned in one direction.

4. A pipe threader comprising a tubular member having an end adapted to be clamped to a pipe to be externally threaded, said tubular member having a threaded portion, disposed beyond an end of the pipe, a die supporting head having a threaded bore for engaging said threaded portion, a plurality of thread cutting dies carried by the head for engaging said end of the pipe, means for turning the die head, relatively to the tubular member, whereby the threaded portion will form a feed screw for moving the die head relatively to the tubular member and pipe to cause the dies to cut a thread in the outer side of said pipe end, said tubular member having an opposite, restricted end, a bearing member detachably and adjustably mounted thereon, said turning means including a gear keyed to the die supporting head, a shaft journaled in and slidably mounted relatively to said bearing, said shaft having a restricted polygonal shaped end for engaging a turning tool, and a pinion formed integral with the opposite end of said shaft for meshing with said gear for revolving the die supporting head.

5. A pipe threader comprising a chuck having one end disposed in a pipe to be threaded and its opposite end projecting from an end of the pipe, means for detachably clamping the chuck to the pipe, said chuck having a threaded portion forming a feed screw, a die supporting head having a threaded portion for engaging said feed screw, dies mounted in said head and carried thereby for threading the outer side of the aforementioned end of the pipe when the head is revolved relatively to the chuck in a direction for advancing it toward the pipe, a gear carried by the head, a bearing adjustably connected to the chuck, a shaft turnably and slidably mounted in the bearing, and a pinion on the shaft to mesh with the gear for rotating the head when the shaft is revolved.

ALFRED M. STULTZ.